Figure 1:
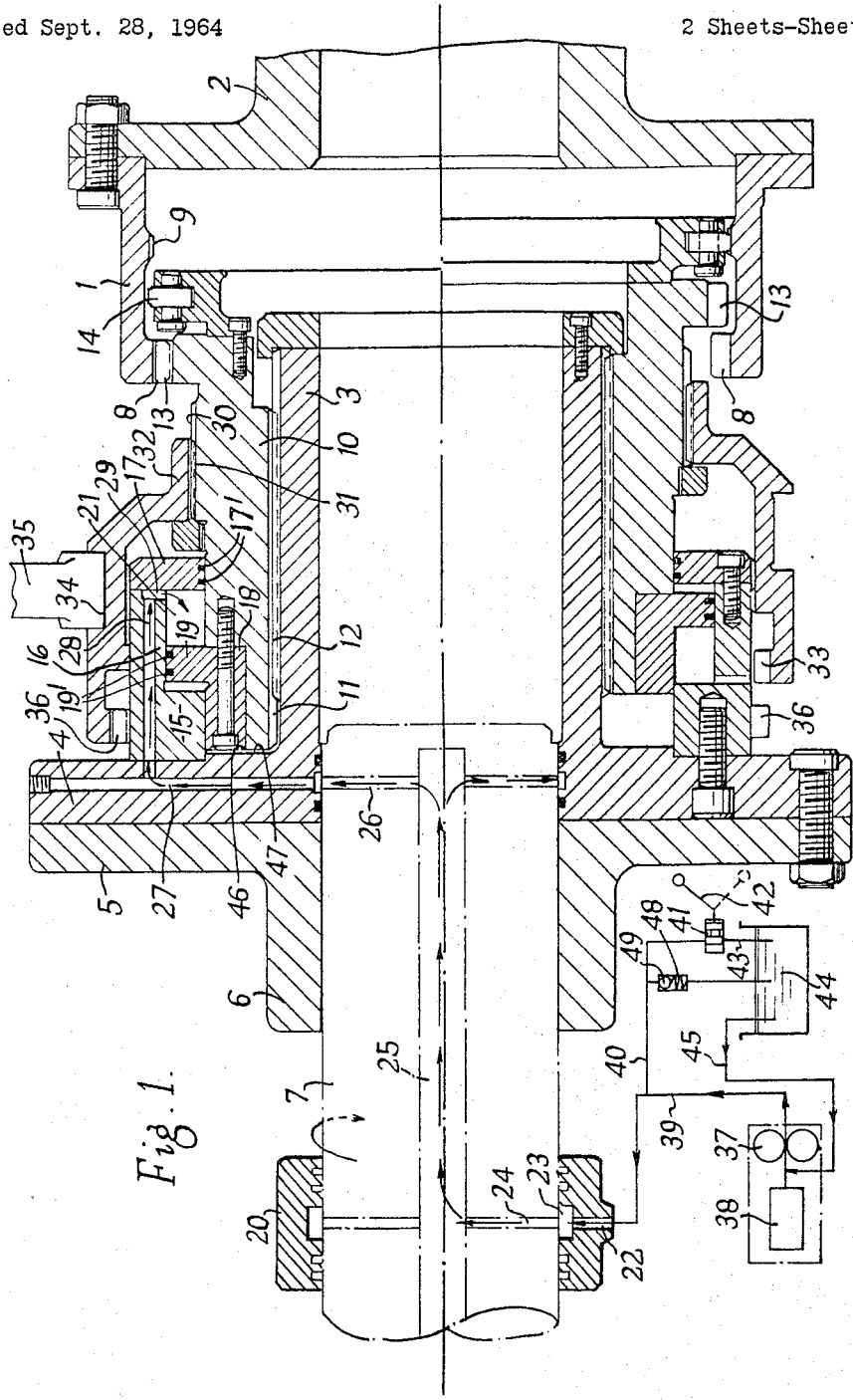

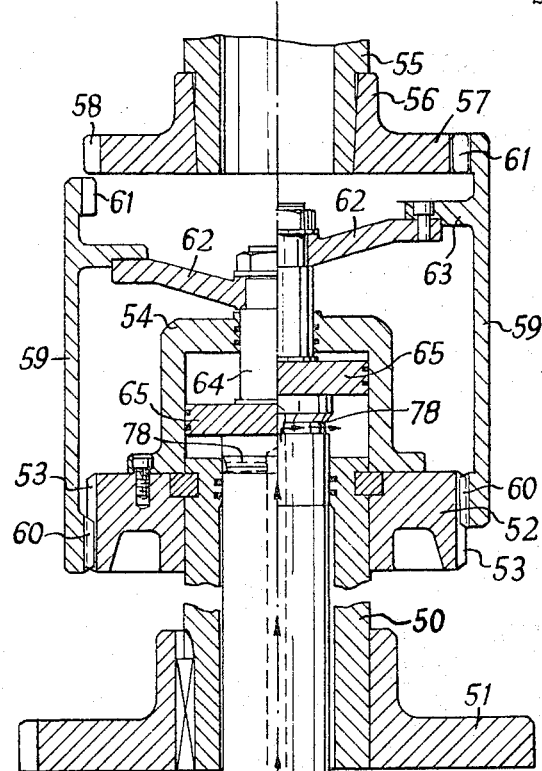
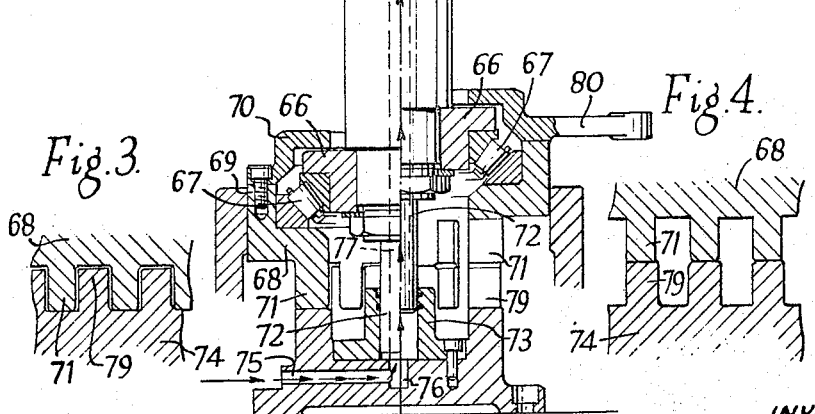

United States Patent Office 3,272,295
Patented Sept. 13, 1966

3,272,295
ROTARY CLUTCHES
Herbert Arthur Clements, Weybridge, Surrey, England, assignor to S.S.S. Patents Limited, London, England
Filed Sept. 28, 1964, Ser. No. 399,593
Claims priority, application Great Britain, Sept. 30, 1963, 38,474/63
5 Claims. (Cl. 192—67)

This invention relates to rotary clutches of the type wherein the parts to be clutched together are provided ordinarily with straight jaw clutch teeth that extend axially with respect to the clutch axis. It is impracticable to disengage such clutches whilst they are rotating (or stationary) and transmitting substantial torque since the clutch teeth would be overloaded due to the progressive reduction of the surface area transmitting torque as the coacting teeth are slid out of engagement. There are however requirements for toothed clutches of the above type which can be disengaged rapidly whilst under high load, and the object of the invention is to provide such a clutch.

In accordance with the invention there is provided a rotary clutch comprising a first clutch member provided with clutch teeth, a second clutch member arranged coaxially with said first clutch member, a toother intermediate member constrained by inter-engaging helical teeth or splines on said intermediate and second clutch members to move helically relative to said second clutch member, whereby the clutch may be arranged so that it tends to disengage, under the action of driving torque applied to one of said first and second clutch members, by helical movement of said intermediate member relative to said second clutch member, clutch locking means movable to and from an operative position in which said locking means prevent said disengagement and in which the transmission of driving torque through the clutch involves loading of said locking means, the clutch being adapted for the controlled application of pressure to said intermediate member in a direction to relieve the loading on said locking means whereby to permit said locking means to be moved from said operative position to condition the clutch for disengagement under the action of the torque acting through said helical splines when the said axial pressure is released.

Embodiments of the invention will now be described by way of example with reference to the accompanying drawings, in which FIG. 1 is a view in axial section of a clutch according to the invention, intended for operation with its axis horizontal, the clutch being shown engaged in the upper half of the figure and disengaged in the lower half, FIG. 2 is a view in longitudinal section of another clutch according to the invention intended for operation with its axis vertical, the clutch being shown engaged in the right hand side of the figure and disengaged in the left hand side, FIG. 3 is a development view of stop members, shown in an interengaged condition, and FIG. 4 is a development view of the stop members showing them in a disengaged condition.

The clutch shown in FIG. 1 comprises a first clutch member formed by a sleeve 1 carried by a hollow output shaft 2, and the second clutch member comprises a sleeve 3 projecting axially from the flange 4 bolted to a flange 5 formed on a boss 6 mounted on an input shaft 7. The sleeve 1 is formed with a ring of internal clutch teeth 8, and with a ring of internal ratchet teeth 9. An intermediate member in the form of a clutch sleeve 10 is mounted on the sleeve 3, being formed with internal right handed helical splines 11 engaged with external helical splines 12 formed on the sleeve 3, and with a ring of external clutch teeth 13. The clutch sleeve 10 also carries a ring of pawls 14, the noses of which point in clockwise direction as viewed from the left hand end of the clutch as seen in FIG. 1.

To the flange 4 is bolted a flange 15 on a hollow cylindrical part 16 to the end of which is bolted a ring 17 in sliding contact with the outer surface of the clutch sleeve 10, and provided with sealing rings 17'. A ring 18 bolted to the clutch sleeve 10 is formed with an external annular flange 19 the outer surface of which is provided with sealing rings 19' and is in sliding contact with the inner surface of the part 16, the flange 19 thus serving as a piston that cooperates with the cylinder formed by the flange 15, part 16 and ring 17. A stationary oil muff 20 within which the shaft 7 is rotatable communicates with the cylinder space 21 via a port 22 and annular cavity 23 in the muff 20, ducts 24, 25 and 26 in the shaft 7, radial ducts 27 in the flange 4 and a ring of axial ducts 28 and ports 29 in the cylindrical part 16.

The clutch sleeve 10 is formed with external straight splines 30 with which are engaged internal splines 31 in a control sleeve 32 which projects over the cylindrical part 16 and is formed with a ring of internal locking teeth 33. The control sleeve 32 is also formed with a groove 34 in which engages a control fork part of which is shown at 35. The cylindrical part 16 is formed with a ring of external locking teeth 36.

Means, shown diagrammatically, are provided for creating oil pressure when required within the cylinder space 21. The said means include a pump 37 driven by an electric motor 38. The pump outlet pipe 39 is connected to the port 22 in the muff 20, a branch pipe 40 leading from the pipe 39 to the inlet of a control valve 41 operable by a lever 42, and a pipe 43 leads from the outlet of valve 41 to a sump 44, from which the pump 37 draws via a pipe 45.

The operation is as follows:

The lever 42 is normally in the lower position shown in broken lines, in which the valve 41 is open and oil delivered by the pump 37 flows from pipe 39 to the sump 44, creating no substantial pressure in the cylinder space 21.

With the clutch disengaged, as shown in the lower half of FIG. 1, viz. with the clutch teeth 8 and 13 disengaged and the locking teeth 33 withdrawn from the locking teeth 36, if the input shaft 7 is rotated in the driving direction, shown by the arrow, relative to the output shaft 2, or if the shaft 2 is rotated in the opposite direction the pawls 14 ratchet relative to the ratchet teeth 9. In order to engage the clutch, by any convenient procedure, the input shaft 7 is rotated slowly in the direction opposite to the arrow relative to the output shaft 2, or the shaft 2 is rotated in the direction of the arrow relative to the input shaft 7. In either case pawls 14 will engage ratchet teeth 9, with the effect that the clutch sleeve 10 is shifted helically relative to the sleeve 3 (to the left in FIG. 1) so as to bring its clutch teeth 13 into precise interengagement with the clutch teeth 8. Prior to the teeth 13 and 8 becoming fully engaged the ends of the locking teeth 33 are opposite the ends of the locking teeth 36, but when the clutch teeth 13 and 8 are fully interengaged the locking teeth 33 are opposite the gaps between the locking teeth 36 on the cylindrical part 16, and the control sleeve 32, which hitherto would have been baulked by the abutting engagement of the ends of the locking teeth 33 and 36, can be slid (to the left in FIG. 1) by actuation of the control fork 35, to engage the locking teeth 33 with the locking teeth 36 and so lock the clutch in the engaged condition. Preferably, resilient means are provided for actuating the control fork, being operated so as prior to engagement to bring the locking teeth 33 into nuzzling engagement with the locking teeth 36, so that at the instant of full interengagement of the clutch teeth 8 and 13 the locking teeth 33 snap into interengagement with the locking teeth 36, thereby locking the clutch in the engaged condition and preventing movement of the clutch sleeve 10 to the extent that its end surface 46 is in contact with the surface 47 of the flange 27.

When rotation of the input shaft 7 in the driving direction is resumed, the output shaft 2 will also be driven, driving torque being transmitted via the locking teeth 33 and 36, the straight splines 30 and 31 and the clutch teeth 8 and 13.

When it is required to disengage the clutch under load, the lever 42 is moved to the upper position in which the valve 41 is closed, with the effect that the fluid pressure in the cylinder space 21 rapidly builds up to a high value determined by the strength of the spring 48 of a relief ball valve 49 connected between the pipe 40 and the sump 44. The effect of the pressure increase in space 21 is to apply an axial pressure to the clutch sleeve 10 so as to shift it fractionally to the left as seen in FIG. 1 to bring the end surface 46 into contact with the surface 47, thereby relieving the splines 30 and 31 and the locking teeth 33 and 36 from loading, so that torque is then transmitted through the clutch via the helical splines 11 and 12 and the clutch teeth 8 and 13, the locking teeth 33 and 36 and the straight splines 30 and 31 being unloaded. The control sleeve 32 can then be slid to the right under the action of the control fork 35 to bring the locking teeth 33 out of engagement with the locking teeth 36, thereby unlocking the clutch. The lever 42 is then quickly returned to its lower position, thereby opening the valve 41 and allowing the fluid pressure in the cylinder space 21 to fall rapidly to the point at which the interaction between the helical splines 11 and 12 shifts the clutch sleeve 10 quickly to the right, thereby disengaging the clutch teeth 8 and 13 and bringing the clutch to the disengaged ratchetting condition shown in the lower half of FIG. 1.

The clutch shown in FIGS. 2, 3 and 4 comprises a hollow input shaft 50 on which is keyed a driving flange 51, and on which is mounted a ring 52 formed with external helical splines 53, and an end cap 54. The shaft 50 is carried in bearings (not shown) that prevent it from moving axially. A hollow output shaft 55 has keyed thereon a boss 56 with a flange 57 formed with a ring of external straight clutch teeth 58. The intermediate member of the clutch comprises a cylindrical clutch sleeve 59 formed with internal helical splines 60 engaged with the splines 53, and with a ring of internal straight clutch teeth 61. A disc 62 is bolted at its periphery to an internal annular flange 63 on the clutch sleeve 59, and at its centre to the upper end of a rod 64 which extends through the input shaft 50 and projects from the lower end thereof. Near its upper end the rod 64 is formed with a piston 65 which is movable longitudinally in the cylindrical space within the end cap 54, and the lower end rests via a ring 66 and a thrust bearing 67 on a ring 68 formed with an annular flange 69 to which is bolted a retaining ring 70, the ring 68 also being formed with a ring of downwardly projecting angularly spaced stop members 71. The rod 64 is formed at its lower end with a spigot 72 which is slidable vertically in a guide 73 located in a base 74. A duct 75 in the base 74 communicates via a port 76 with an axial duct 77 in the rod 64, the duct 77 communicating via radial ducts 78 with the space below the piston 65. The base 74 is formed with a ring of upwardly projecting angularly spaced stop members 79, with which the stop members 71 are capable of interengaging.

The duct 75 is connected to a controllable source of fluid under pressure, which is not shown in FIG. 2 but will be assumed to be the same as shown in FIG. 1, the duct 75 being connected to the pump outlet pipe 39.

The operation is as follows:

With the clutch disengaged, as shown at the left hand side of FIG. 2, the rod 64 is in a lowered position in which the stop members 71 and 79 are interengaged and the clutch teeth 61 are out of engagement with the clutch teeth 58. The lever 42 (FIG. 1) is in its lower position so that no fluid pressure is applied to the piston 65. When it is required to engage the clutch the lever 42 is raised to its upper position to apply fluid pressure to the underside of the piston 65, to lift it. In general, this operation will bring the clutch teeth 61 into end to end abutting relationship with the clutch teeth 58, and it will be necessary to rotate the shaft 51 and sleeve 59 or the shaft 55 slowly by conventional means until the clutch teeth 61 are opposite the intertooth gaps between the clutch teeth 58, whereupon the teeth 61 move rapidly into interengagement with the teeth 58, under the action of the fluid pressure acting on the piston 65, the rod 64 to bring the piston 65 into engagement with the underside of the cap 54 and to lift the stop members 71 out of engagement with the stop members 79. A lever 80 on ring 70 is then turned to rotate the ring 68 so as to bring the lower surfaces of the stop members 71 into alignment with the upper surfaces of the stop members 79, the movement of the lever 80 being limited by a suitable stop (not shown). At this stage the clutch teeth 61 are slightly vertically beyond their position of full engagement with the clutch teeth 58. The lever 42 is then lowered to open valve 41 and thereby reduce the fluid pressure beneath the piston 64, whereupon the rod 64 moves downwardly under gravity until the stop members 71 rest on the stop members 79 as shown in FIG. 4, this movement of the rod 64 lowering the clutch teeth 61 into full interengagement with the clutch teeth 58.

When driving torque is applied to the input shaft 50 the torque is transmitted to the output shaft 55 via the helical splines 53 and 60 and the clutch teeth 61 and 58. The hand of the splines 53 and 60 is such that the driving torque transmitted through them tends to disengage the clutch by moving the clutch sleeve 59 downwardly, but downward movement of the clutch sleeve 59 is prevented by the abutting stop members 71 and 79.

When it is required to disengage the clutch under load, the lever 42 is raised to close valve 41 and thereby apply high fluid pressure to the space beneath the piston 65, thereby raising the piston 65 and clutch sleeve 59 slightly and lifting the stop members 71 slightly from the stop members 79. The lever 80 is then turned to bring the stop members 71 into vertical alignment with the gaps between the stop members 79, the movement of the lever 80 being limited by a further stop (not shown). The lever 42 is then lowered to release the fluid pressure rapidly from the space beneath piston 65, whereupon the interaction of the helical splines 53 and 60 together with the action of gravity causes the rod 64 and sleeve 59 to drop, bringing the stop members 71 into interengagement with the stop members 79 (FIG. 3), and bringing the clutch teeth 61 out of engagement with the clutch teeth 58.

I claim:

1. A rotary toothed clutch comprising a first rotary clutch member and a secondary clutch member, an intermediate member, means constraining said intermediate member for helical movement relative to said second clutch member in one helical direction to engage the clutch teeth at least partially and in the other helical direction to disengage said clutch teeth, the application of driving torque to the clutch in one angular direction, with said clutch teeth engaged, tending to disengage said clutch teeth by relative helical movement of said intermediate member in said other helical direction, clutch locking means adjustable, with the clutch engaged, to an operative setting in which said locking means oppose said relative helical movement of said intermediate member in said other helical direction, whereby disengagement of the clutch under the action of driving torque is opposed by a loaded condition of said locking means that oppose adjustment of said locking means out of said operative setting, and the clutch including load relief means energizable from a controllable power source to urge said intermediate member in said one helical direction when the clutch is engaged, whereby to relieve said locking means from said loaded condition and thereby enable said clutch locking means to be adjusted out of said operative setting, so that the clutch is disengageable under the action of driving torque when said load relief means cease to be energized.

2. A rotary toothed clutch according to claim 1, adapted for energization of said load relief means by fluid under pressure from said power source, said relief means comprising a piston and cylinder, an operating surface of said piston being movable with said intermediate member, and at least one duct for fluid leading from said cylinder to the exterior of the clutch for connection to said power source.

3. A rotary toothed clutch according to claim 1 wherein said clutch locking means comprise a control member, locking teeth carried by said control member, locking teeth carried by said second clutch member, means constraining said control member for movement relative to said intermediate member into and out of an operative position in which said locking teeth carried by said control member are engaged with said locking teeth carried by said second clutch member to oppose relative helical movement of said intermediate member in said other helical direction and said locking teeth are loaded when driving torque is applied to the clutch whereby adjustment of said clutch locking means out of said operative setting is opposed, said relief means when energized from said power source urging said intermediate member in said one helical direction whereby to relieve the loading of said locking teeth carried by said control member and permit adjustment of said control member out of said operative setting.

4. A rotary toothed clutch according to claim 1 wherein said clutch locking means comprise axial stop means adapted, when the clutch is engaged, to be adjusted to an operative setting in which movement of said intermediate member in said other helical direction is opposed by said axial stop means and in which position the transmission of driving torque through the clutch loads said axial stop means, said relief means when energized from said power source urging said intermediate member in said one helical direction whereby to relieve said stop means from load and permit adjustment of said stop means out of said operative setting.

5. A rotary toothed clutch according to claim 1 wherein said clutch locking means comprise axial stop means adapted, when the clutch is engaged, to be adjusted to an operative setting in which said movement of said intermediate member in said other helical direction is opposed by said axial stop means and in which the transmission of driving torque through the clutch loads said axial stop means whereby adjustment of said axial stop means out of said operative setting is opposed, said relief means when energized from said power source urging said intermediate member in said one helical direction whereby to relieve said axial stop means from load and permit adjustment of said axial stop means out of said operative setting, said axial stop means comprising a first ring of fixed angularly spaced first stop members, a second ring of angularly spaced second stop members connected to said intermediate member, means mounting said second ring for rotation, with the clutch engaged, into a position in which said first stop members are in abutting relationship with said second stop members whereby said stop members are loaded axially and, with driving torque transmitted by the clutch, oppose movement of said intermediate member in the direction to disengage the clutch, said load relief means when energized from said power source urging said intermediate member in said one helical direction whereby to relieve the loading of said stop members and permit rotation of said second ring into a position in which said second stop members are opposite gaps between said first stop members so that when said relief means cease to be energized the clutch is enabled to disengage.

References Cited by the Examiner
UNITED STATES PATENTS
2,733,791    2/1956    Short _____ 192—114 X DAVID J. WILLIAMOWSKY, Primary Examiner.

B. W. WYCHE III, Assistant Examiner.